US011144879B2

(12) United States Patent
Nitta et al.

(10) Patent No.: US 11,144,879 B2
(45) Date of Patent: Oct. 12, 2021

(54) EXPLORATION BASED COGNITIVE CAREER GUIDANCE SYSTEM

(71) Applicant: INTERNATIONAL BUSINESS MACHINES CORPORATION, Armonk, NY (US)

(72) Inventors: Satyanarayana V. Nitta, Cross River, NY (US); Sharad C. Sundararajan, Hopewell Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 328 days.

(21) Appl. No.: 15/367,141

(22) Filed: Dec. 1, 2016

(65) Prior Publication Data
US 2018/0158025 A1  Jun. 7, 2018

(51) Int. Cl.
*G06Q 10/00* (2012.01)
*G06Q 10/10* (2012.01)
*G06Q 10/06* (2012.01)

(52) U.S. Cl.
CPC . *G06Q 10/1053* (2013.01); *G06Q 10/063112* (2013.01)

(58) Field of Classification Search
CPC ....... G06Q 10/1053; G06Q 10/063112; G06Q 10/0639; G06Q 10/2057
See application file for complete search history.

(56) References Cited

U.S. PATENT DOCUMENTS

| 5,326,270 A * | 7/1994 | Ostby .................. G09B 7/04 434/118 |
| 8,398,490 B1 * | 3/2013 | Phelon ................. G06Q 10/06 463/42 |
| 9,679,495 B2 * | 6/2017 | Cohen .................. G09B 7/00 |
| 2005/0197988 A1 * | 9/2005 | Bublitz ............... G06Q 10/105 706/46 |
| 2008/0176197 A1 * | 7/2008 | Hartog .................. G09B 19/00 434/236 |
| 2009/0210296 A1 * | 8/2009 | Goolden .......... G06Q 10/06398 705/7.42 |
| 2010/0144441 A1 | 6/2010 | Judicibus |
| 2011/0055101 A1 | 3/2011 | Lucas et al. |

(Continued)

OTHER PUBLICATIONS

Takanori, Ishijima and Kyoko, Kobayashi, 2011, Human Resource Development information management system . . . , published Jul. 9, 2011, Japan Invention Patent, pp. 1-16. (Year: 2011).*

(Continued)

*Primary Examiner* — Matthew S Gart
*Assistant Examiner* — Stephen S Swartz
(74) *Attorney, Agent, or Firm* — ntelletek Law Group, PLLC; Gabriel Daniel, Esq.

(57) ABSTRACT

An exploration-based career guidance system is disclosed. The career guidance system receives an assessment regarding a candidate and identifies a first set of roles for the candidate based on the assessment. The system receives a selection of a role from among the first set of roles and provides a simulated experience of the selected role and receives a set of interaction data from the simulated experience. The system adjusts the assessment regarding the candidate based on the set of interaction data and identifies a second, different set of roles for the candidate based on the adjusted assessment.

20 Claims, 12 Drawing Sheets

(56) References Cited

U.S. PATENT DOCUMENTS

| | | | | |
|---|---|---|---|---|
| 2013/0203026 A1* | 8/2013 | Sundaresh | ............... | G09B 7/00 |
| | | | | 434/219 |
| 2013/0226674 A1* | 8/2013 | Field | ..................... | G06Q 50/20 |
| | | | | 705/7.38 |
| 2014/0162224 A1* | 6/2014 | Wallace | .................. | G09B 5/06 |
| | | | | 434/219 |
| 2014/0172732 A1* | 6/2014 | Baladi | ................ | G06Q 10/1053 |
| | | | | 705/321 |
| 2015/0140526 A1* | 5/2015 | Marino | ............. | G06Q 10/1053 |
| | | | | 434/219 |
| 2015/0317759 A1 | 11/2015 | Jing et al. | | |
| 2016/0034761 A1 | 2/2016 | Frankel et al. | | |
| 2016/0104260 A1* | 4/2016 | Menrad | ............. | G06Q 50/2057 |
| | | | | 705/328 |
| 2016/0283905 A1* | 9/2016 | Lahti | .................... | G06Q 10/105 |
| 2016/0364692 A1* | 12/2016 | Bhaskaran | ......... | G06Q 10/1053 |

OTHER PUBLICATIONS

Brusilovsky, Peter "Adaptive Information Systems: From Adaptive Hypermedia to the Adaptive Web," School of Information Sciences, University of Pittsburgh, USA, http://www.pitt.edu/~peterb/2480-012/L1.pdf.

Hannafin et al., "Open Learning Environment" SUNY Courtland faculty website: http://web.cortland.edu/frieda/ID/IDtheories/32.html, Dec. 1998.

Krieshok et al., "Career decision making: The limits of Rationality and the Abundance of Non-Conscious Processes," Journal of Vocational Behavior, vol. 75 No. 3 pp. 275-290, Dec. 2009.

Minsky, Marvin "Questioning "General" Education," OLPC Wiki, https://web.media.mit.edu/~minsky/OLPC-4.html, Feb. 2008.

* cited by examiner

EXPLORATION BASED COGNITIVE CAREER GUIDANCE SYSTEM

BACKGROUND

Technical Field

The present disclosure generally relates to methods and systems for career guidance.

Description of the Related Art

Cloud computing and storage solutions provide users with various capabilities to store and process their data in data centers that may be located far from the user. Cloud computing provides users access to powerful computing and network resources without having to incur the cost of purchasing the equipment.

SUMMARY

In some embodiments, a career guidance system receives an assessment regarding a candidate and identifies a first set of roles for the candidate based on the first assessment. The system receives a selection of a role from among the first set of roles and provides a simulated experience of the selected role and receives a set of interaction data from the simulated experience. The system adjusts the set of assessment regarding the candidate based on the set of interaction data and identifies a second, different set of roles for the candidate based on the adjusted set of assessment.

In some embodiments, the career guidance system receives a set of assessment regarding a candidate and identifies a set of roles for the candidate based on the set of assessment. The system receives a selection of a role from among the set of roles and provides a simulated experience of the selected role. The system receives a set of interaction data from the simulated experience and produces a recommendation for the candidate based on the received interaction data.

In some embodiments, a computer device that includes a display unit and a set of processing units provides the career guidance system. The set of processing units is configured to provide a graphical user interface (GUI) at the display unit. The career guidance system receives background information regarding the candidate by using the GUI and derives a set of assessment regarding a candidate from the received background information. The system displays a set of roles for the candidate and receives a selection of a role from among the set of roles by using the GUI, wherein the roles are identified based on the set of assessment. The system provides a simulated experience of the selected role and receives a set of interaction data from the simulated experience by using the GUI. The system also produces a recommendation for the candidate based on the received interaction data.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a Summary, Detailed Description and the Drawings are provided. Moreover, the claimed subject matter is not to be limited by the illustrative details in the Summary, Detailed Description, and the Drawings, but rather is to be defined by the appended claims, because the claimed subject matter can be embodied in other specific forms without departing from the spirit of the subject matter.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Some embodiments of the disclosure provide a career guidance system that allows exploration of what-if scenarios. By providing rich exploration and what-if scenarios to a job-seeking user, the system minimizes hiring mismatches and missed career opportunities.

In some embodiments, the system takes user preferences and profiles, either directly or inferred, to enable active exploring and experiencing of a variety of career choices to better inform the decisions by prospective employer and employees. The system dynamically generates configurable assessment based on user preference and/or profile, the assessment expressed in different career suitability dimensions. The system uses the assessment to provide immersive virtual environments of different job roles for the job-seeking user to explore and experience. The usage of a virtual environment is modeled to provide insights back to the job-seeking user and to adjust the configurable assessment for further exploration. A virtual environment for a job role embeds tasks specific to the job role to provide a more realistic experience of the role.

Figure 1:
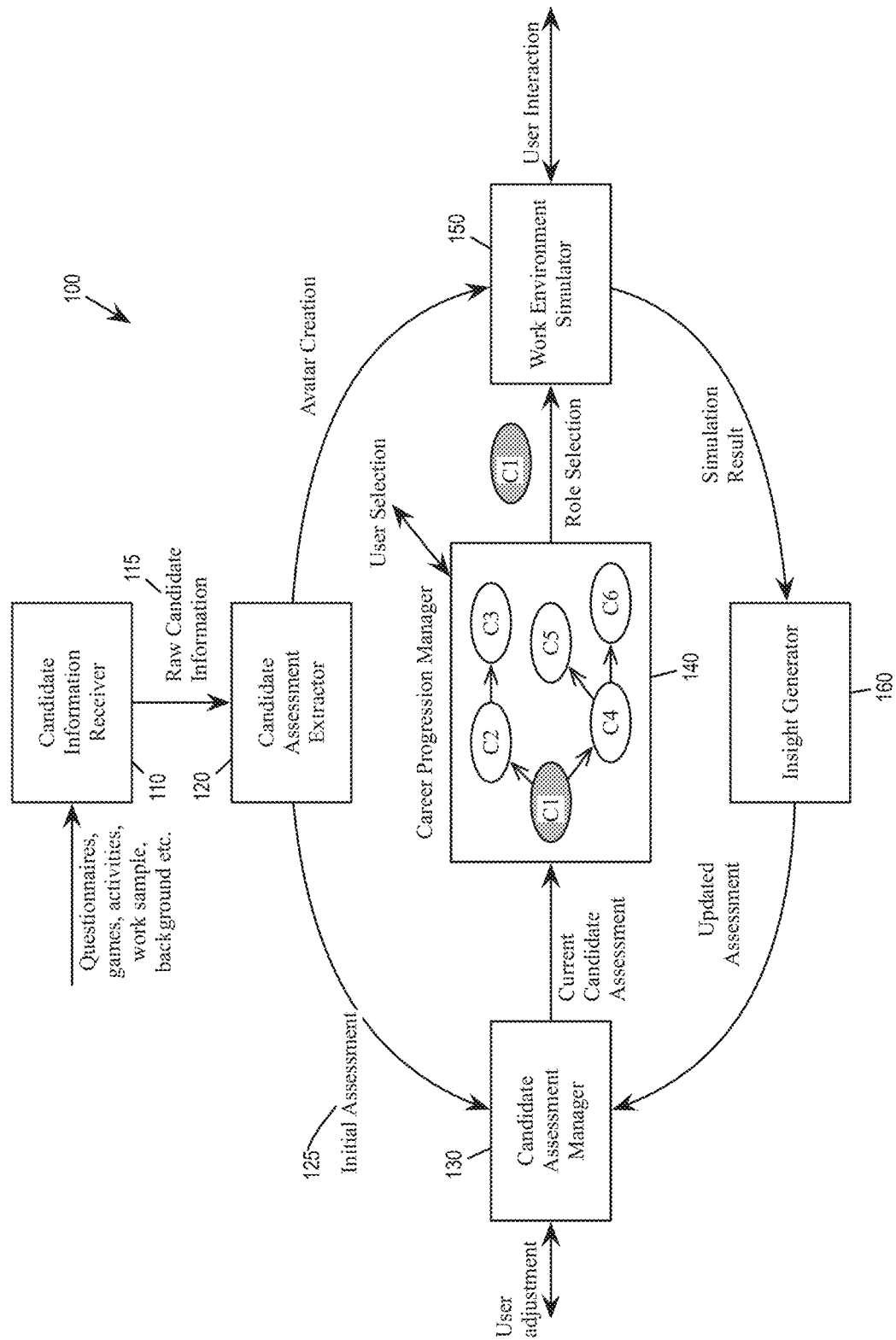
FIG. 1 illustrates a career guidance system that allows exploration of what-if scenarios according to some embodiments of the disclosure.

FIG. 1 illustrates a career guidance system 100 that allows exploration of what-if scenarios according to some embodiments of the disclosure. A user of the system (a job seeker or a candidate) may use the system to explore likely suitable job roles, while a prospective employer may use the system to identify suitable candidates for job roles that need to be filled. The career guidance system receives raw information about the candidate user, recommends job roles based on the candidate's aptitudes and skills, generates a virtual environment of a job role for the candidate to explore and experience, and produces insight regarding the candidate's aptitudes and skills that aids the candidate's further exploration using the career guidance system. The candidate may also use the system to identify his own strengths and weaknesses in order to upgrade his own skill set for a particular job role.

As illustrated, the career guidance system 100 includes a candidate information receiver 110, a candidate assessment extractor 120, a candidate assessment manager 130, a career progression manager 140, a work environment simulator 150, and an insight generator 160.

The candidate information receiver 110 receives raw candidate information 115 and relays the information to the candidate assessment extractor 120. The extractor 120 analyzes the raw candidate information and produces a set of initial assessment 125 of the candidate for the candidate assessment manager 130. The candidate assessment manager 130 maintains and updates the set of candidate assessment. The current up-to-date candidate assessment is provided to the career progression manager 140. The career progression manager 140 identifies a progression of careers or job roles and allows the user to select a job role. The selected job role is forwarded to the work environment simulator 150. The work environment simulator 150 provides a virtual environment or simulation based on the selected job role and allows the candidate user explore, experience and interact with the virtual environment. The insight generator 160 analyzes the result of the interaction and produces an updated assessment to the candidate assessment manager 130. The career progression manager 140 then uses the updated candidate assessment to produce an updated career progression. The candidate user may use the system 100 to iteratively select simulations of different job roles to explore and refine the assessment of his aptitude and skills, or his suitability for a particular job role.

In some embodiments, the various components of the career guidance system 100 are software modules of a program being executed by one or more processing units of a computing device. In some embodiments, the computing device includes an input device and a display device for implementing a user interface in order to receive user selection of job roles, user adjustment of assessment, as well as to allow user to interact with the virtual environment (the input device and the display device can be a same device such as a touch screen or virtual reality goggle). The components of the career guidance system 100 are explained in greater detail below.

The candidate information receiver 110 is configured to receive raw candidate information 115. This raw candidate information can include a work sample, a response to a questionnaire, a job application, a biography, a webpage related to the candidate, a school transcript, a description of the candidate's background, or other data that describes the candidate. In some embodiments, the candidate information receiver 110 gathers the raw information of the candidate by interacting with the candidate, such as providing a questionnaire to the candidate and gathering the candidate's response, or providing a game and recording the candidate's actions while playing the game, etc. The gathered raw candidate information 115 is forwarded to the candidate assessment extractor 120.

The candidate assessment extractor 120 analyzes the raw candidate information 115 and produces an initial assessment 125 of the candidate. In some embodiments, the extractor 120 includes one or more scoring modules for analyzing the raw candidate information 115 in order to produce a set of scores as the initial assessment 125. Each of the score is for a different category or dimension for quantizing or assessing the aptitudes and/or skills of the candidate. The initial assessment 125 is the first assessment of the candidate by the career guidance system 100, which maintains, updates, and/or refines the assessment based on subsequent interactions with the candidate.

Figure 2:
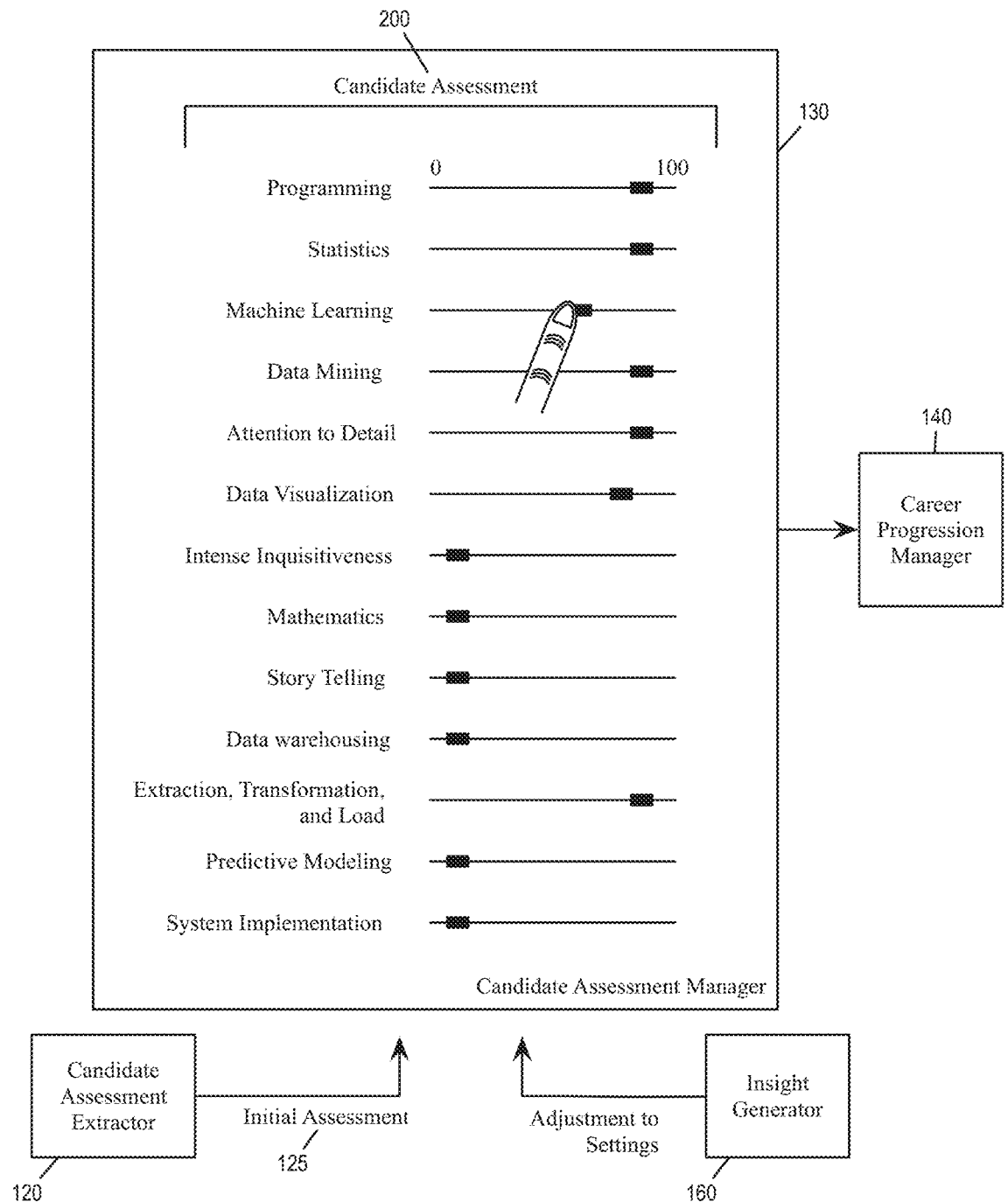
FIG. 2 illustrates an example candidate assessment maintained by the career guidance system for a candidate.

FIG. 2 illustrates an example candidate assessment 200 maintained by the career guidance system 100 for a candidate. As illustrated, candidate assessment 200 includes an array of assessment scores, each score being the score of a dimension of the candidate's skills and/or aptitudes. In the illustrated example, the assessment includes the following dimensions: "programming," "statistics," "machine learning," "data mining," "attention to detail," "data visualization," "intense inquisitiveness," "mathematics," "story telling," "data warehousing," etc. The candidate has a score in each dimension. For example, in the "programming" dimension, the candidate's score may be around 90. In the "mathematics" dimension, the candidate's score may be around 10.

The candidate assessment manager 130 maintains and updates the candidate assessment 200. It receives the initial candidate assessment 125 from the candidate assessment extractor 120. Based on this initial candidate assessment, the candidate assessment manager 130 provides the candidate assessment to the career progression manager 140 and receives updates to the candidate assessment from the insight generator 160.

In addition to being updatable, the candidate assessment 200 is also configurable. In some embodiments, the candidate assessment manager 130 allows the candidate user to freely modify or edit the assessment score in the candidate assessment. In FIG. 2, the assessment score of each dimension is illustrated as a slider that can be manipulated by the user, and the user is illustrated as using the slider corresponding to the dimension "machine learning" to manipulate the assessment score in that dimension. The system may use a dial or GUI elements of other types to receive modification to the candidate assessment. The system may also allow the user to directly edit the score textually.

In some embodiments, the career guidance system 100 scores the candidate according to two different types of assessment categories or dimensions. The categories of the first type quantify the candidate's specific skills, i.e., the candidate's ability at accomplishing different types of tasks. The categories of the second type quantify the candidate's general personality traits.

Figure 3:
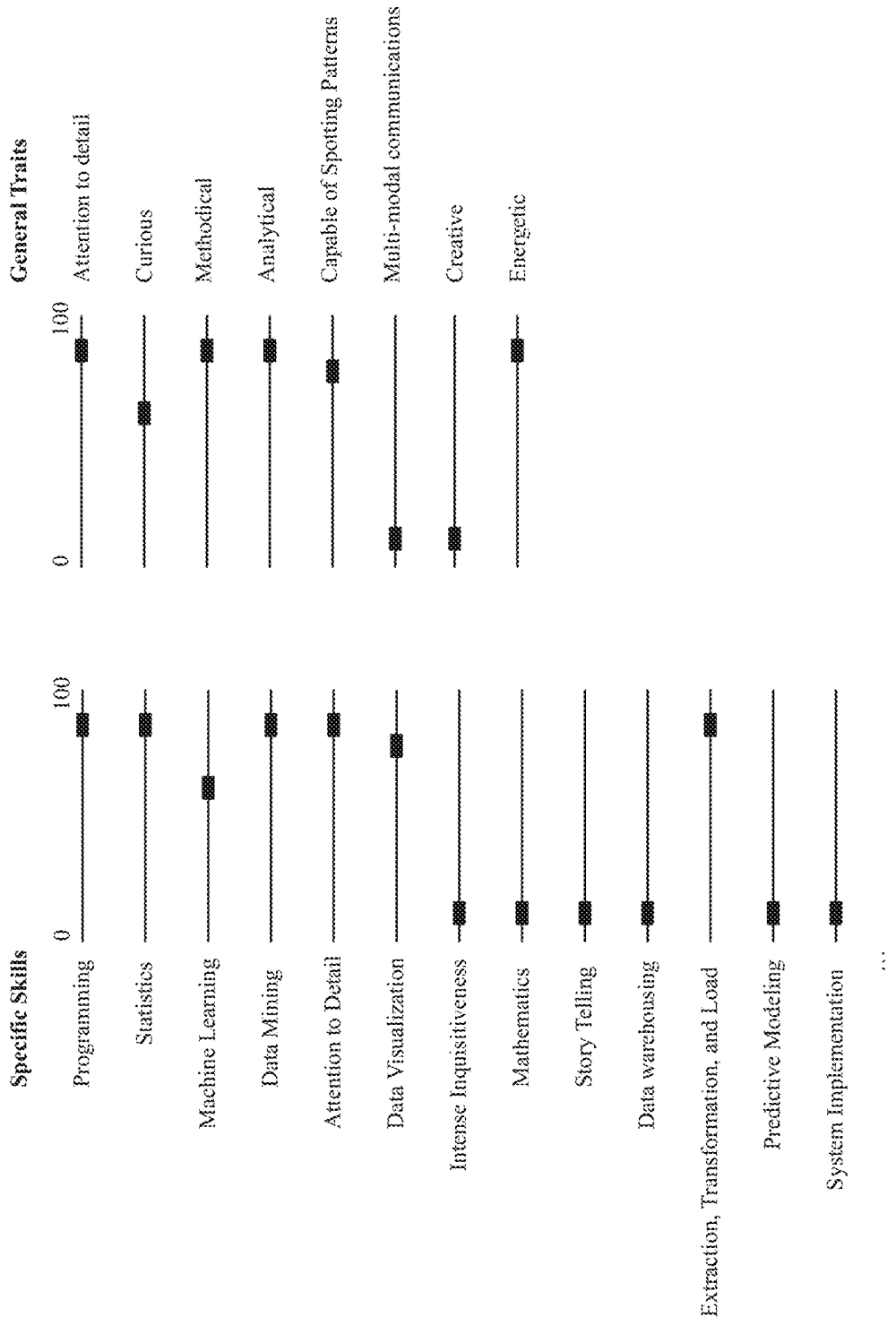
FIG. 3 illustrates example assessment dimensions for both specific skills and general traits being used by the career guidance system.

FIG. 3 illustrates example assessment dimensions for both specific skills and general traits being used by the career guidance system 100. In some embodiments, the initial candidate assessment 125 produced by the candidate assessment extractor 120 includes scores for both types of categories. The candidate assessment manager 130 allows assessment dimensions of both types to be configurable or editable by the candidate. The career progression manger 140 uses assessment scores of both types to generate career progressions for the candidate.

The career progression manager 140 generates a progression of careers or job roles for the candidate based on the up-to-date assessment of the candidate. A career progression identifies a set of job roles that are inter-related. The related job roles are presented as a progression or flow based on their inter-relatedness. A candidate user can use the generated career progression to navigate and explore different job roles by following the flow of relationships between the different job roles.

Figure 4:
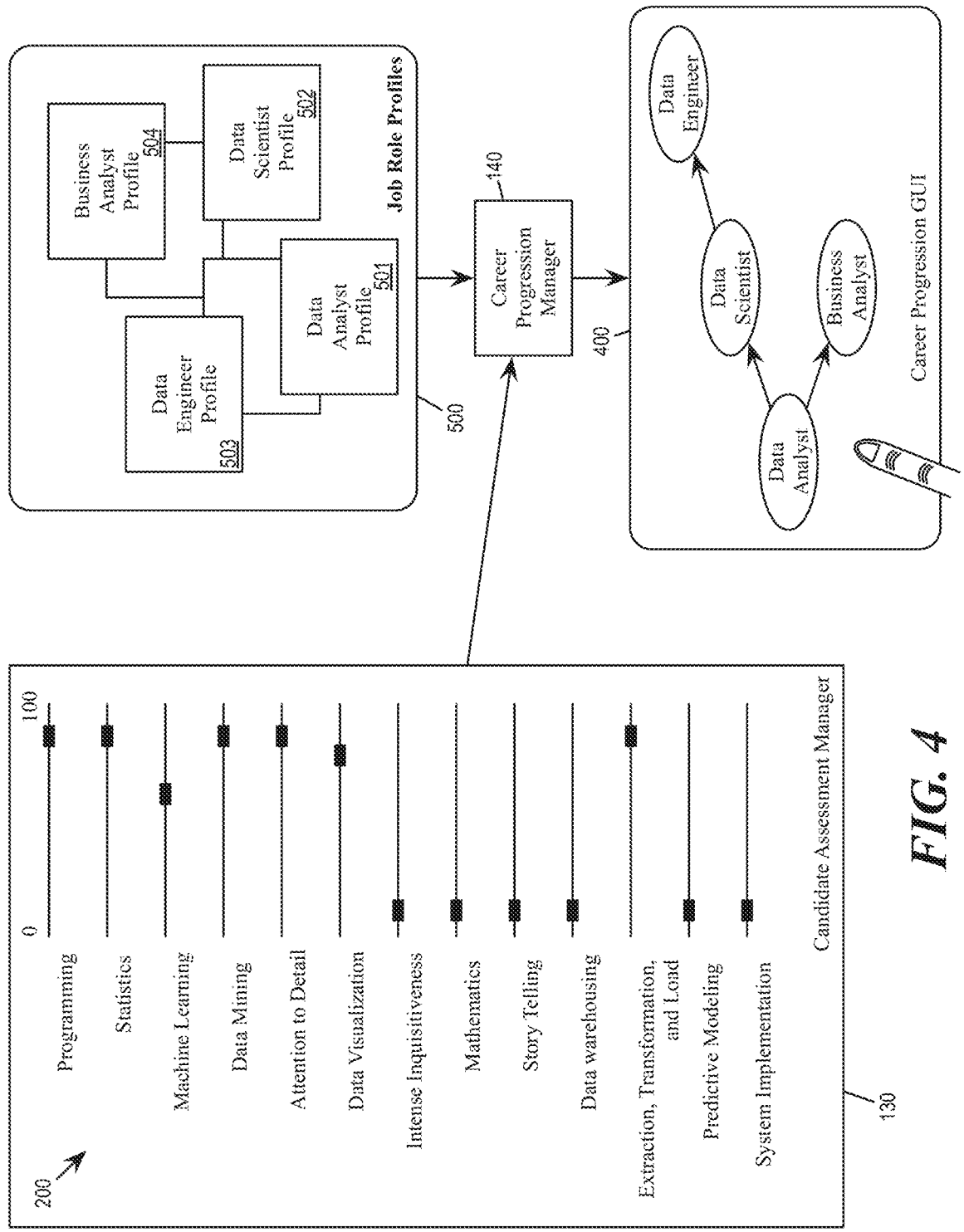
FIG. 4 illustrates an example career progression generated by the career progression manager.

FIG. 4 illustrates an example career progression 400 generated by the career progression manager 140. As illustrated, the career progression 400 identifies four different job roles: data analyst, data scientist, data engineer, and business analyst. The career progression 400 shows the relationship between these four roles in terms of which job role should be considered after which job role, or which job role is a natural progression after which job role. In the example career progression, a node for "data scientist" and a node "business analysts" are shown as following a node for "data analyst," while a node for "data engineer" follows the node for "data scientist". In other words, the career progression 400 suggests a career path from being a data analyst to being a data scientist to being a data engineer, or an alternative career path from being a data analyst to being a business analyst.

FIG. 4 also illustrates the generation of the career progression 400 based on the candidate assessment 200. As illustrated, the candidate assessment manager 130 provides the candidate assessment 200 to the candidate progression manager 140. The career progression manager 140 has a set of job role profiles 500 for various different types of job roles. The career progression manager 140 uses the job role profiles 500 to correlate with the candidate assessment 200. The result of the correlation is used to identify the job roles that are potentially suitable to the candidate. In the example, the correlation between the candidate assessment and the profiles of data analyst, data scientist, data engineer, and business analyst (profiles 501-504, respectively) indicate that these job roles are likely to be suitable for the candidate. The career progression manager 140 therefore generates the career progression 400 based on these four job roles.

Figure 5:
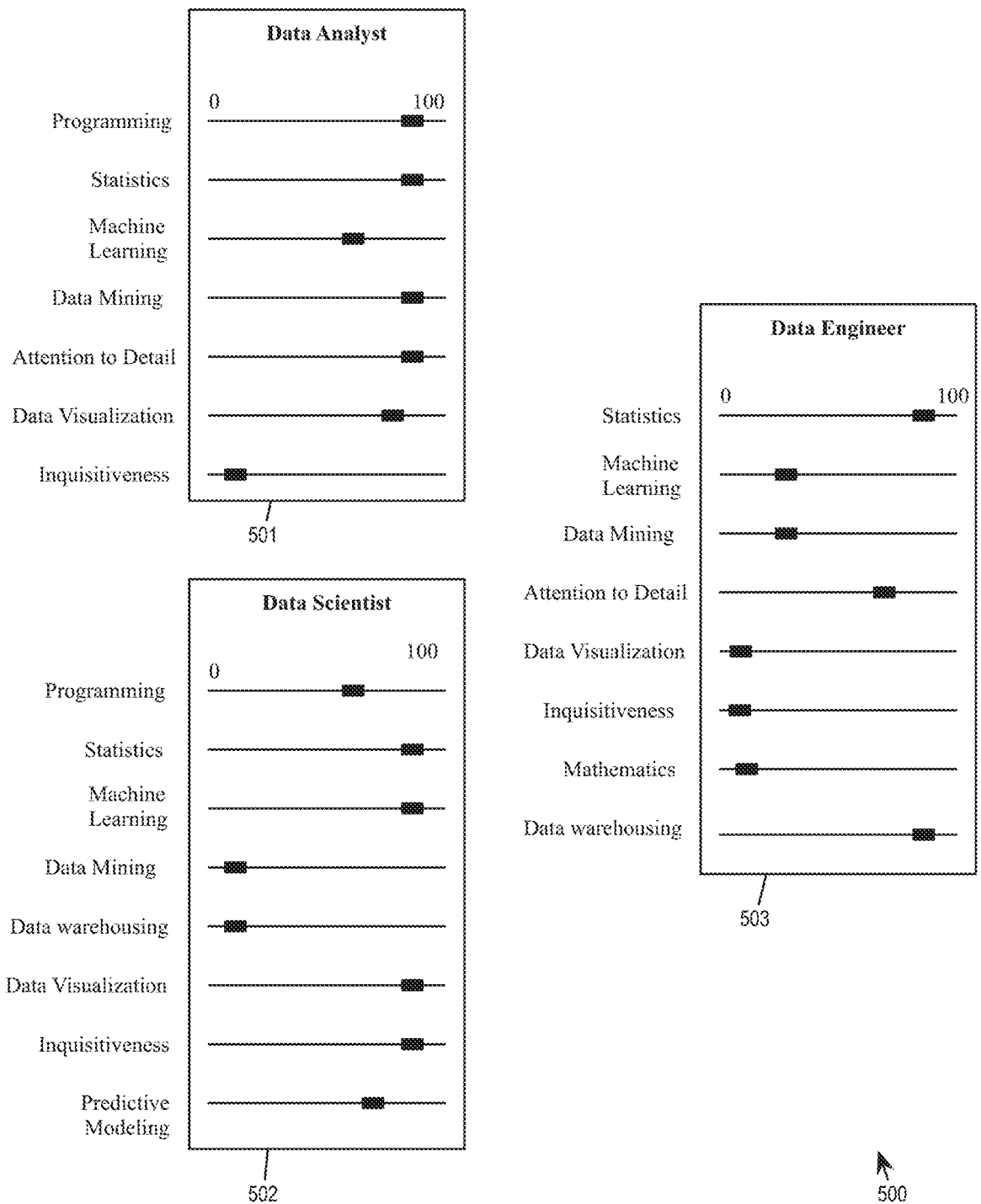
FIG. 5 illustrates some example profiles of different types of career or job roles that are used for generating a career progression.

FIG. 5 illustrates some example profiles of different types of career or job roles that may be used for generating a career progression. The figure illustrates example job-role profiles for a data analyst (profile 501), data scientist (profile 502) and data engineer (profile 503). Each profile has a set of scores (illustrated as sliders), each score corresponding to one of the candidate assessment dimensions, i.e., programming, statistics, machine learning, data mining, etc. As illustrated, different profiles have scores for different sets of candidate assessment dimensions, because different job roles may regard different skills or personality traits as relevant. The career progression manager 140 compares or correlates the scores in each of the profiles 500 (including profiles 501-503) against the candidate assessment 200 in order to select job roles to include in the career progression 400.

The career progression 140 is presented to the candidate user so the candidate user can select one of the job roles in the career progression for exploration. The career progression manager 140 presents the career progression 400 as a GUI in which the career progression 400 is represented by a tree of several nodes, each node being a selectable GUI item that corresponds to a job role. This is to allow the candidate user to select a job role for exploration by selecting one of the GUI items. The career progression manager 140 receives the job role selection and forwards the selection to the work environment simulator 150.

Based on the selected job role, the work environment simulator 150 provides a virtual environment and lets the candidate user explore, experience and interact with the virtual environment. The interaction between the candidate user and the simulation is forwarded to the insight generator 160 to be analyzed. The result of analysis produces an updated assessment to the candidate assessment manager 130. The career progression manager 140 then uses the updated candidate assessment to produce an updated career progression, which in turn allows the candidate user to select and explore another job role simulation at the work environment simulator 150, so on and so forth. In other words, the career guidance system 100 has an iterative loop for dynamically refining the assessment of a candidate by providing a work environment simulation based on an updated candidate assessment and then uses the result of the simulation to update the candidate assessment. The candidate user may use the system to iteratively select simulations of different careers to explore. The iterative explorations refine the assessment of the candidate's aptitudes, skills, and suitability for particular job roles.

Figure 6A:
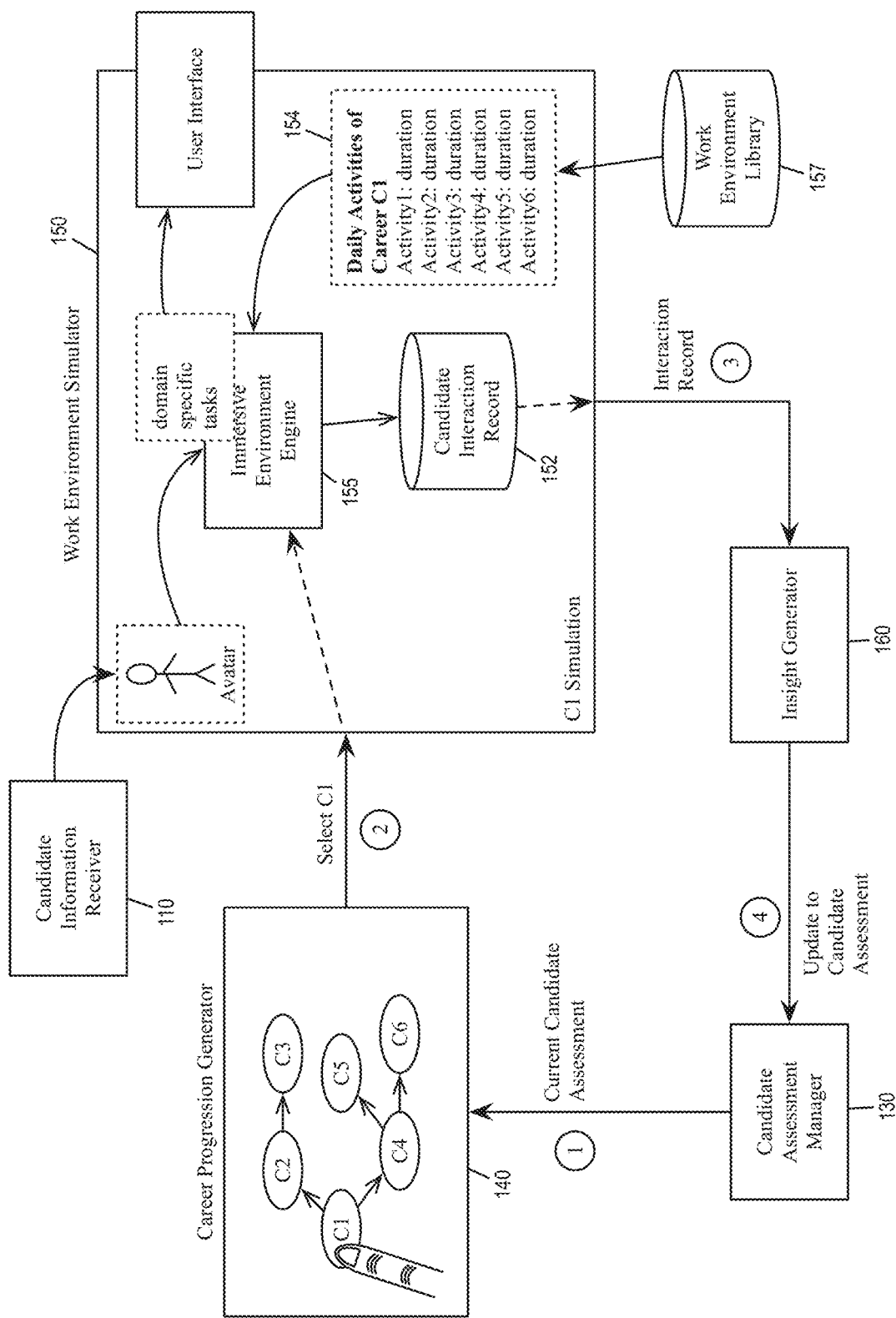
FIG. 6a-b illustrates the iterative loop in the career guidance system for dynamically refining the assessment of the candidate by job role exploration.
Figure 6B:
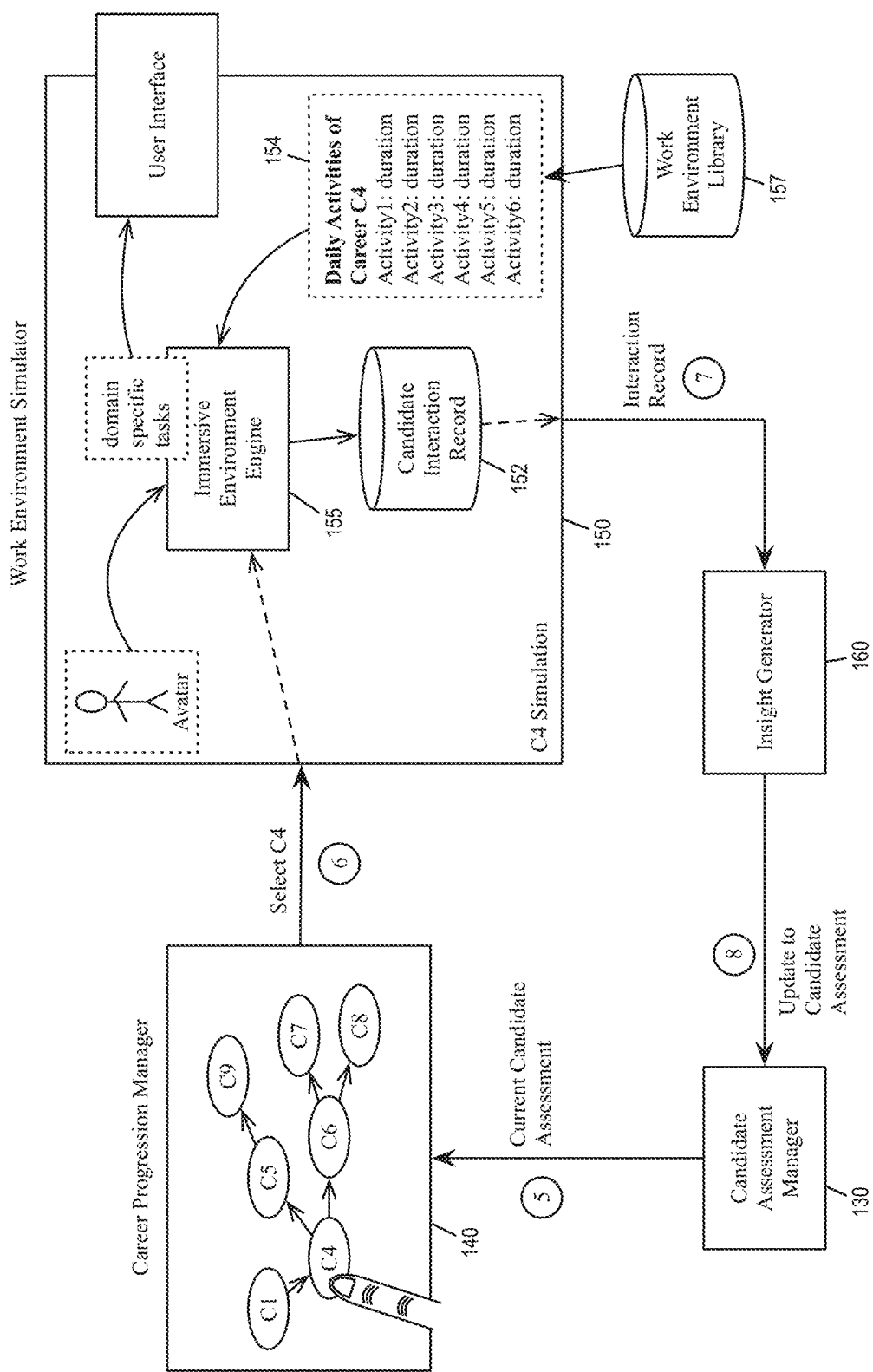

FIGS. 6a-b illustrate the iterative loop in the career guidance system 100 for dynamically refining the assessment of the candidate by job role exploration. The iterative loop provides a work environment simulation exploring what-if scenarios based on the candidate assessment and then uses the result of the simulation to update the candidate assessment. The figure illustrates a loop that starts from the candidate assessment manager 130, to the career progression manager 140, then to the work environment simulator 150, then to the insight generator 160, then back to the candidate assessment manager 130, and so on. FIG. 6a shows a first iteration of the loop and FIG. 6b shows a second iteration of the loop.

At the start of the first iteration (FIG. 6a), the candidate assessment manager 130 provides the current candidate assessment to the career progression manager 140 (dataflow labeled '1'). The career progression manager 140 generates a career progression that starts at career "C1" and may progress to careers "C2" through "C6". The candidate uses the GUI of the career guidance system 100 to select C1 as the career to explore (dataflow labeled '2'), and the work environment simulator 150 generates a simulation (or "immersive experience") of the job role "C1" for the candidate to explore. The candidate's interaction with the virtual work environment of job role "C1" is captured by the simulator 150 and forwarded to the insight generator 160 (dataflow labeled '3'), which analyzes the interaction data and causes the candidate assessment manager 130 to update the assessment of the candidate (dataflow labeled '4').

At the start of the second iteration (FIG. 6b), the candidate assessment manager 130 provides the current candidate assessment (updated after the exploration of career "C1") to the career progression manager 140 (dataflow labeled '5'). The career progression manager 140 generates a different career progression that starts at career "C1" and may progress to careers "C4" through "C9" based on the new candidate assessment. The candidate uses the GUI of the career guidance system 100 to select C4 as the career to explore (dataflow labeled '6'), and the work environment simulator 150 generates a simulation (or "immersive experience") of the job role "C4" for the candidate to explore. The candidate's interaction with the virtual work environment of job role "C4" is captured by the simulator 150 and forwarded to the insight generator 160 (dataflow labeled '7'), which analyzes the interaction data and causes the candidate assessment manager 130 to update the assessment of the candidate (dataflow labeled '8').

FIGS. 6*a*-*b* also conceptually illustrate the operations of the work environment simulator 150. As illustrated, at the center of the work environment simulator 150 is an immersive environment engine 155 that allows exploration of what-if scenarios. The immersive environment engine 155 receives the selection of a job role from the career progression manager 140. Based on the selected job role, the immersive environment engine 155 retrieves the necessary work environment data from a work environment library 157. To enhance the immersive experience of the virtual work environment, the immersive environment engine 155 receives background information about the candidate from the candidate assessment extractor 120 (or the candidate information receiver 110) and creates an avatar of the candidate user. The user candidate interacts with the immersive environment engine 155 through the user interface of the career guidance system 100, or through a user interface dedicated to presenting the virtual work environment (such as a virtual reality goggle). The user interaction with the virtual work environment is captured and recorded in a candidate interaction record storage 152.

In some embodiments, the work environment data provided to the immersive environment engine 155 for a job role includes a storyboard 154 of the job role. Such a storyboard may specify the daily activities that someone having the job role would have to perform. The storyboard may also specify the approximate time duration expected for each activity. For example, the story board of a data scientist may include activities such as basic exploratory data analysis, data cleaning, machine learning, statistics, creating visualizations, presenting analysis, extracting/transforming/loading data, etc. For each activity, the storyboard may include data on how much time the activity may take and/or how many times the activity is performed in a predetermined time period (e.g., per day, per week, etc.).

As part of an activity, the work environment simulator 150 may present a domain-specific task for the candidate user to perform. For example, for a job role that involves coding computer programs, the immersive environment engine 155 may present a coding platform for the user to write a program. The work products of the candidate as well as any intermediate steps undertaken are stored in the candidate interaction record storage 152, along with other interactions of the user candidate with the virtual work environment.

The stored interaction record is presented to the insight generator 160, which analyzes the result of the interaction to provide insight as to the candidate user's skills and personality traits. In some embodiments, the insight generator 160 performs skill check and/or knowledge check of the candidate's work products during the simulation. The analysis produces an updated assessment to the candidate assessment manager 130.

Figure 7:
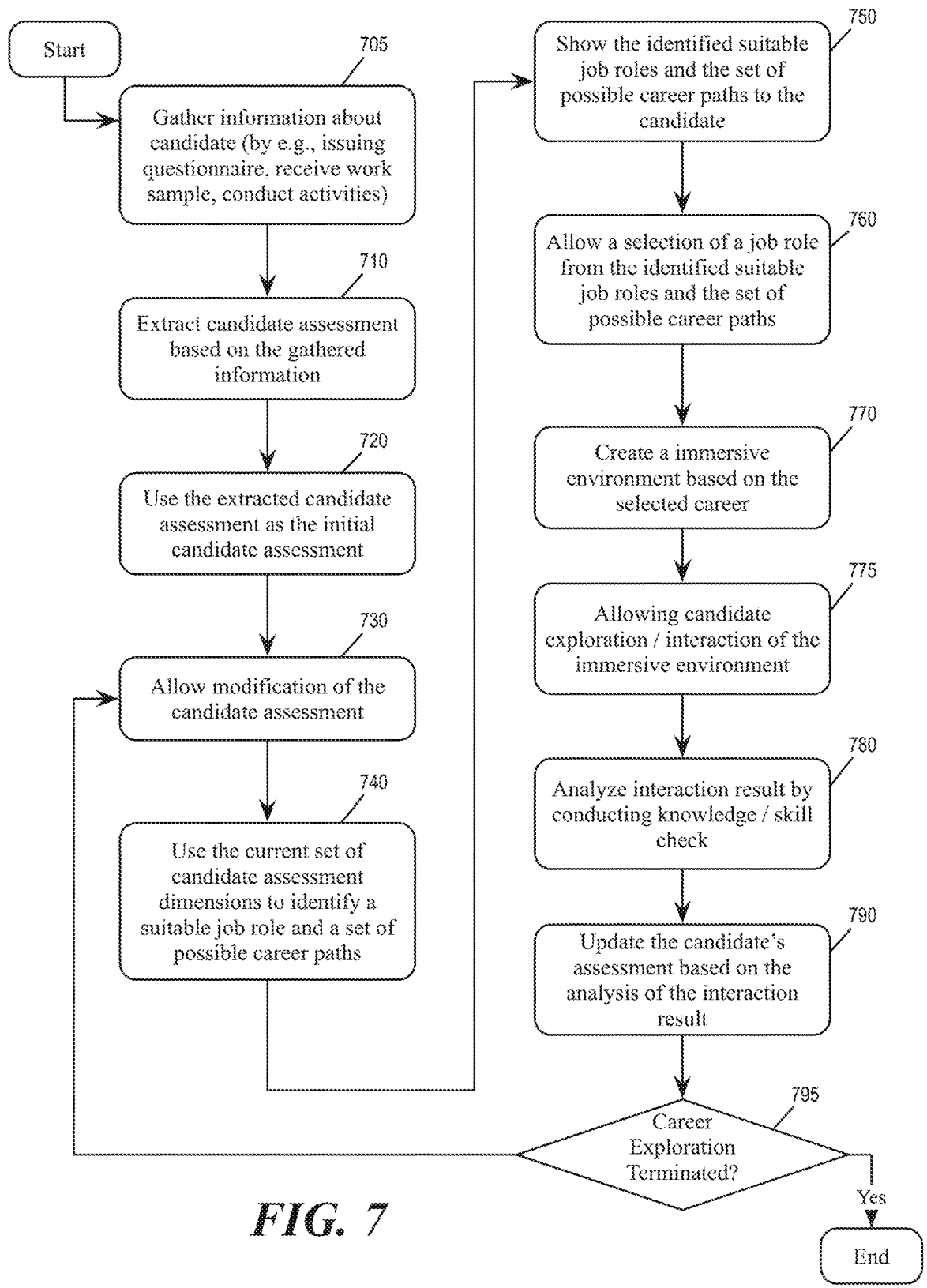
FIG. 7 conceptually illustrates a process for providing an exploration based career guidance system.

FIG. 7 conceptually illustrates a process 700 for providing an exploration based career guidance system. In some embodiments, a set of processing units in a computing device performs the process 700 by executing instruction sets to serve as the career guidance system 100. In some embodiments, the processing units performing the process 700 do so by executing a software having modules that correspond to the various components of the career guidance system 100, i.e., the candidate information receiver 110, the candidate assessment extractor 120, the candidate assessment manager 130, the career progression manager 140, the work environment simulator 150, and the insight generator 160.

The process 700 starts by gathering (at 705) raw information about candidate. This raw candidate information can include a work sample, a response to a questionnaire, a job application, a biography, a webpage related to the candidate, a school transcript, a description of the candidate's background, or other data that describes the candidate. The process may gather the raw information of the candidate by interacting with the candidate, such as providing a questionnaire to the candidate and gathering the candidate's response, or providing a game and recording the candidate's actions while playing the game, etc.

The process extracts (at 710) candidate assessment based on the gathered raw information about the candidate. The process analyzes the raw candidate information and produces an initial assessment of the candidate. The process analyzes the raw candidate information and produces a set of scores as an initial assessment. Each of the scores is for a different category or dimension for quantizing or assessing the aptitudes and/or skills of the candidate. FIGS. 2 and 3 illustrate examples of candidate assessment. In some embodiments, the process 700 scores the candidate according to at least two different types of assessment categories or dimensions. The categories of the first type quantify the candidate's specific skills. The categories of the second type quantify the candidate's general personality traits. The process uses (at 720) the extracted candidate assessment as an initial candidate assessment, i.e., the first assessment of the candidate's skills and personality traits.

At 730, the process allows modification of the candidate assessment. The candidate user and/or the employer user may view and tweak the current assessment of the candidate's skills and personality trait. In some embodiments, the process allows the modification of the candidate assessment by providing GUI items such as sliders for the various dimensions of the candidate's assessment.

The process uses (at 740) the current set of candidate assessment dimensions to identify a suitable job role and a set of possible career paths. In some embodiments, the process correlates a set of models or profiles for various different types of careers or job roles with the candidate assessment. Based on the result of the correlation, the process 700 identifies one or more job roles as potentially suitable to the candidate. The process also shows (at 750) the identified suitable job roles and the set of possible career paths to the candidate as a progression of careers or job roles. The process further allows (at 760) a selection of a job role from the identified suitable job roles and the set of possible career paths.

The process creates (at 770) an immersive environment based on the selected career and allows (at 775) the candidate user to explore and interact with the immersive environment. The immersive environment provides simulations of activities of the job role for the candidate user to experience. The simulation may also include providing a platform for the candidate to perform domain-specific tasks (such as programming) and to turn in their work products.

The process analyzes (at 780) the interaction result from the work environment simulation by conducting a knowledge and/or skill check. This is done to provide insight as to the candidate user's skills and/or personality traits. The process updates (at 790) the candidate's assessment based on the insight produced by the analysis.

At 795, the process determines whether the career exploration using the career guidance system has terminated. If so, the process returns to 730 to further explore job roles and refine the candidate's assessment. Otherwise, the process 700 ends.

It is noted that, provided that the result is substantially the same, the steps of the process 700 are not required to be executed in the exact order shown in FIG. 7.

In some embodiments, the career guidance system has a GUI system for interacting with the candidate user. Such a GUI system receives user selection of job roles, receives user adjustment of the candidate assessment, and allows user interaction with the virtual work environment. The GUI system may include an input device and a display device. The input device and the display device can be a same device such as a touch screen or virtual reality goggle.

Figure 8:
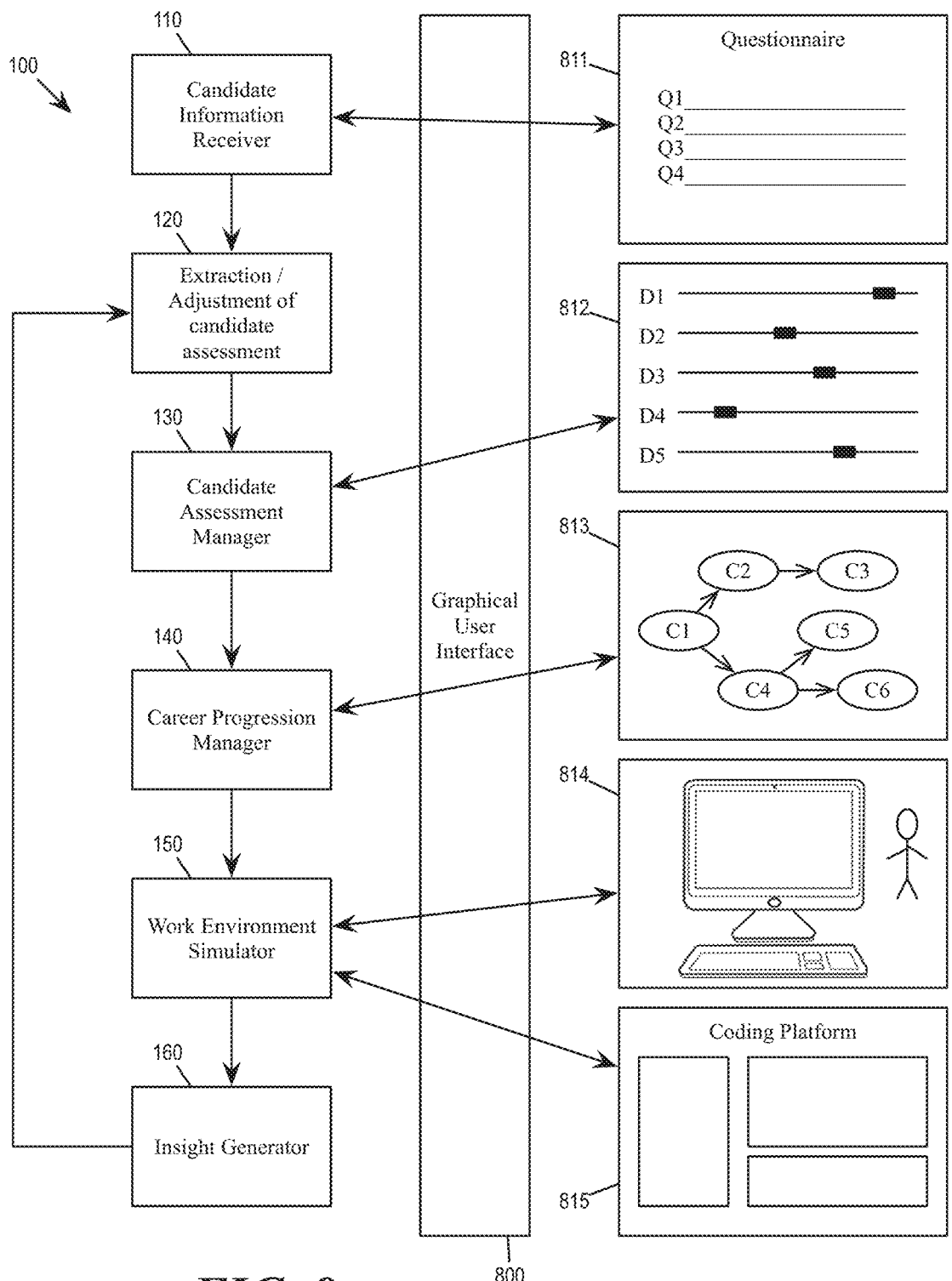
FIG. 8 conceptually illustrates how the career guidance system uses a GUI system to interact with the candidate user.

FIG. 8 conceptually illustrates how the career guidance system 100 uses a GUI system 800 to interact with the candidate user, consistent with an exemplary embodiment. As illustrated, the career guidance system 100 uses a GUI window 811 to receive raw information about the candidate by e.g., providing a questionnaire and receiving a response (at the candidate information receiver 110). The career guidance system also uses a GUI window 812 to present candidate assessment and to receive adjustment of candidate assessment (at the candidate assessment manager 130). The career guidance system also uses a GUI window 813 to present job roles as selectable GUI items in a career progression (at the career progression manager 140). The career guidance system also uses a GUI window 814 to conduct virtual workplace environment simulation (at the work environment simulator 150). The career guidance system also uses a GUI window 815 for providing platforms for domain specific tasks.

In some embodiments, the system conducts all GUI operations and presents all of the GUI windows 811-815 over a same input device and a same display device. In some embodiments, the set of input and display devices used for conducting the GUI of virtual workplace environment simulation (GUI windows 814 and 815) is different from the set of input and display devices used for conducting the GUI of career progression and candidate assessment adjustment (GUI windows 812 and 813).

Example Electronic System

The present application may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
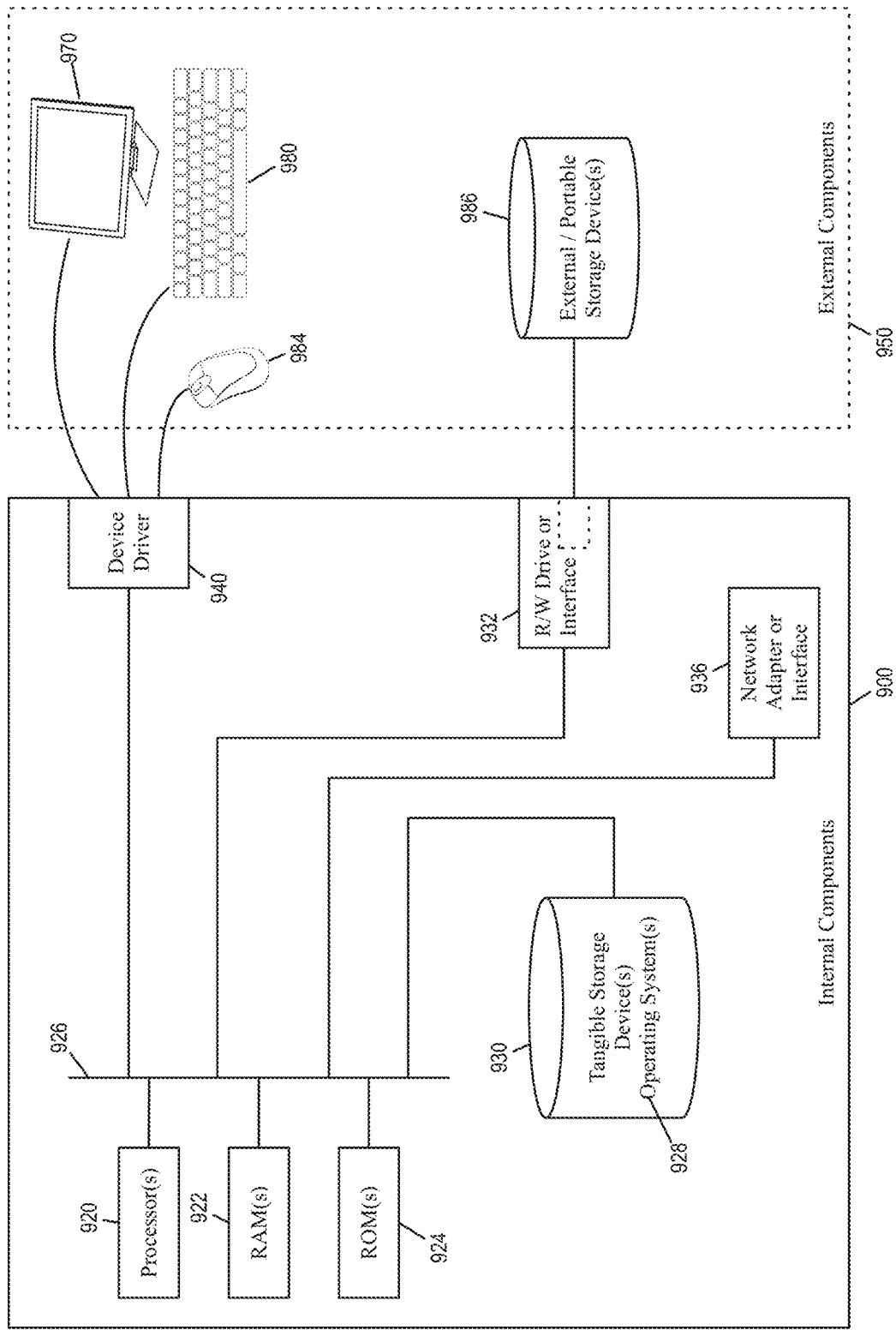
FIG. 9 shows a block diagram of the components of a data processing system in accordance with an illustrative embodiment of the present disclosure.

FIG. 9 shows a block diagram of the components of data processing systems 900 and 950 that may be included within a cloud datacenter that provides a career guidance system over the Internet in accordance with an illustrative embodiment of the present disclosure. It should be appreciated that FIG. 9 provides only an illustration of one implementation and does not imply any limitations with regard to the environments in which different embodiments may be implemented. Many modifications to the depicted environments may be made based on design and implementation requirements.

Data processing systems 900 and 950 are representative of any electronic device capable of executing machine-readable program instructions. Data processing systems 900 and 950 may be representative of a smart phone, a computer system, PDA, or other electronic devices. Examples of computing systems, environments, and/or configurations that may represented by data processing systems 900 and 950 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The data processing systems 900 and 950 may include a set of internal components 900 and a set of external components 950 illustrated in FIG. 9. The set of internal components 900 includes one or more processors 920, one or more computer-readable RAMs 922 and one or more computer-readable ROMs 924 on one or more buses 926, and one or more operating systems 928 and one or more computer-readable tangible storage devices 930. The one or more operating systems 928 and programs such as the programs for executing the process 700 are stored on one or more computer-readable tangible storage devices 930 for execution by one or more processors 920 via one or more RAMs 922 (which typically include cache memory). In the embodiment illustrated in FIG. 9, each of the computer-readable tangible storage devices 930 is a magnetic disk storage device of an internal hard drive. Alternatively, each of the computer-readable tangible storage devices 930 is a semiconductor storage device such as ROM 924, EPROM, flash memory or any other computer-readable tangible storage device that can store a computer program and digital information.

The set of internal components 900 also includes a R/W drive or interface 932 to read from and write to one or more portable computer-readable tangible storage devices 986 such as a CD-ROM, DVD, memory stick, magnetic tape, magnetic disk, optical disk or semiconductor storage device. The instructions for executing the process 700 can be stored on one or more of the respective portable computer-readable tangible storage devices 986, read via the respective R/W drive or interface 932 and loaded into the respective hard drive 930.

The set of internal components 900 may also include network adapters (or switch port cards) or interfaces 936 such as a TCP/IP adapter cards, wireless Wi-Fi interface cards, or 3G or 4G wireless interface cards or other wired or wireless communication links. Instructions of processes or programs described above can be downloaded from an external computer (e.g., server) via a network (for example, the Internet, a local area network or other, wide area network) and respective network adapters or interfaces 936. From the network adapters (or switch port adaptors) or interfaces 936, the instructions and data of the described programs or processes are loaded into the respective hard drive 930. The network may comprise copper wires, optical fibers, wireless transmission, routers, firewalls, switches, gateway computers and/or edge servers.

The set of external components 950 can include a computer display monitor 970, a keyboard 980, and a computer mouse 984. The set of external components 950 can also include touch screens, virtual keyboards, touch pads, pointing devices, and other human interface devices. The set of internal components 900 also includes device drivers 940 to interface to computer display monitor 970, keyboard 980 and computer mouse 984. The device drivers 940, R/W drive or interface 932 and network adapter or interface 936 comprise hardware and software (stored in storage device 930 and/or ROM 924).

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Example Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Example Service Models:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Example Deployment Models:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud-computing environment is service oriented with a focus on statelessness, low coupling, modularity, and semantic interoperability. At the heart of cloud computing is an infrastructure that includes a network of interconnected nodes.

Figure 10:
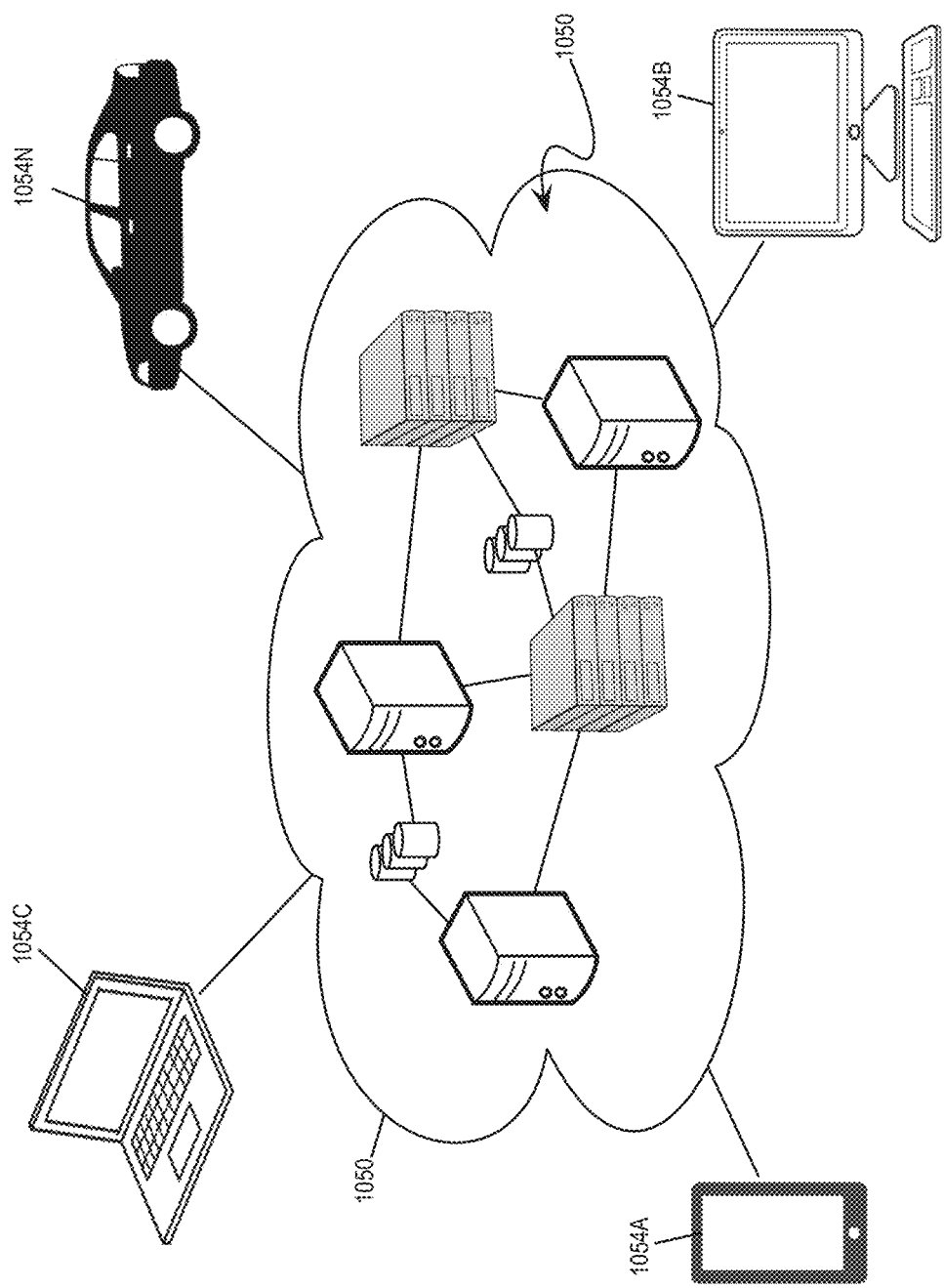
FIG. 10 illustrates a cloud-computing environment.

Referring now to FIG. 10, illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 1010 and cloud computing environment 1050 can communicate with any type of computerized device over any type of network and/or network addressable connection (e.g., using a web browser).

Figure 11:
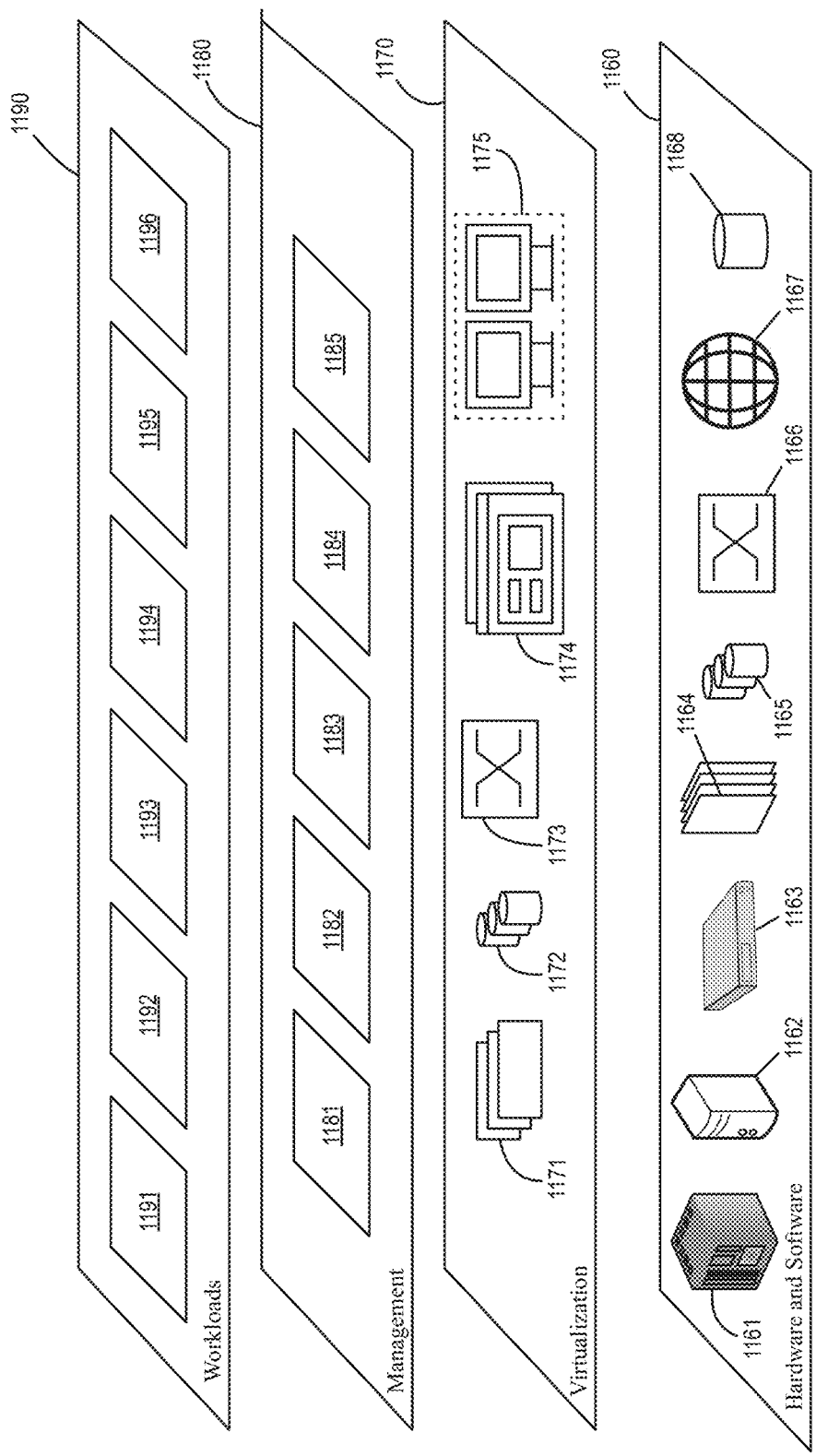
FIG. 11 illustrates a set of functional abstraction layers provided by a cloud-computing environment.

Referring now to FIG. 11, a set of functional abstraction layers provided by cloud computing environment 1050 (FIG. 10) is shown. It should be understood in advance that the components, layers, and functions shown in FIG. 11 are intended to be illustrative only and embodiments of the disclosure are not limited thereto. As depicted, the following layers and corresponding functions are provided:

Hardware and software layer 1160 includes hardware and software components. Examples of hardware components include: mainframes 1161; RISC (Reduced Instruction Set Computer) architecture based servers 1162; servers 1163; blade servers 1164; storage devices 1165; and networks and networking components 1166. In some embodiments, software components include network application server software 1167 and database software 1168.

Virtualization layer 1170 provides an abstraction layer from which the following examples of virtual entities may be provided: virtual servers 1171; virtual storage 1172; virtual networks 1173, including virtual private networks; virtual applications and operating systems 1174; and virtual clients 1175.

In one example, management layer 1180 may provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1183 provides access to the cloud-computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment may be utilized. Examples of workloads and functions which may be provided from this layer include: mapping and navigation 1191; software development and lifecycle management 1192; virtual classroom education delivery 1193; data analytics processing 1194; transaction processing 1195; and career guidance 1196. In some embodiments, the career guidance workload 1196 performs the functions of the candidate information receiver 110, the candidate assessment extractor 120, the candidate assessment manager 130, the career progression manager 140, the work environment simulator 150, and the insight generator 160.

The foregoing one or more embodiments facilitate a career guidance system within a computer infrastructure by having one or more computing devices providing virtual work environment to a candidate user. The computer infrastructure is then used to refine the assessment of the candidate user.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method comprising:
   receiving an assessment regarding a candidate, wherein the assessment comprises an array of assessment scores that can be modified by the candidate;
   identifying a first set of roles for the candidate based on the assessment;
   receiving a selection of a role from among the first set of roles from a user;
   providing a simulated experience of the selected role through an immersive virtual environment created by the computer and collecting a set of interaction data from the simulated experience to determine a suitability for the selected role;
   adjusting the assessment regarding the candidate based on the set of interaction data;
   identifying a second set of roles that are different from the identified first set of roles for the candidate based on the adjusted assessment based on the interaction data from the simulated experience; and
   providing a career progression that indicates a relationship between the second set of roles and which role of the second set of roles to be considered after which role.

2. The method of claim 1, wherein the selection of the role from among the first set of roles is a first selection and the set of interaction data is the first set of interaction data, the method further comprising:
   receiving a second selection of a role from among the second set of roles;
   providing a simulated experience of the second selected role and collecting a second set of interaction data from the simulated experience; and
   adjusting the set of assessment regarding the candidate based on the second set of interaction data; and
   identifying a third set of roles for the candidate based on the adjusted set of assessment.

3. The method of claim 1, wherein receiving the selection of the role from among the first set of roles comprises providing a user interface for receiving the selection.

4. The method of claim 1, wherein each set of the first and second set of roles comprises a progression of different roles.

5. The method of claim 4, wherein the progression of roles comprises one or more career paths that each comprises a set of nodes, each node corresponding to a different role.

6. The method of claim 1:
   wherein receiving the assessment regarding the candidate comprises receiving background information regarding the candidate and extracting the assessment from the received background information regarding the candidate;
   wherein providing a simulated experience of a role comprises providing an avatar to represent the candidate; and
   wherein the avatar is generated based on the received background information regarding the candidate.

7. The method of claim 1, wherein collecting the set of interaction data from the simulated experience of the selected role comprises receiving a work product of the candidate performing the selected role.

8. The method of claim 1, wherein providing the simulated experience comprises providing a coding platform configured to allow the candidate to perform coding tasks.

9. The method of claim 1, wherein adjusting the assessment regarding the candidate based on the set of interaction data comprises performing at least one of (i) a knowledge check, and (ii) a skill check of the interaction data, and adjusting the assessment based on the result of the knowledge or skill check.

10. A computer implemented method comprising:
    receiving an assessment regarding a candidate, wherein the assessment comprises an array of assessment scores that can be modified by the candidate;
    identifying a set of roles for the candidate based on the assessment;
    receiving a selection of a role from among the set of roles from a user;
    providing a simulated experience of the selected role through an immersive virtual environment created by the computer and collecting a set of interaction data from the simulated experience to determine a suitability for the selected role;
    producing a recommendation for the candidate based on the received interaction data; and providing a career progression that indicates a relationship between a second set of roles and which role of the second set of roles to be considered after which role.

11. The method of claim 10 further comprising providing a user interface to allow adjustment of the received assessment.

12. The method of claim 10, wherein receiving the assessment comprises:
generating a questionnaire;
receiving a set of responses to the questionnaire; and
extracting the assessment from the response to the questionnaire.

13. The method of claim 10, wherein receiving the assessment comprises:
analyzing a work product by the candidate; and
adjusting the assessment based on the analysis of the work product.

14. The method of claim 10, wherein receiving the assessment comprises:
receiving a set of raw candidate data; and
extracting a first and second set of scores,
wherein each score in the first set of scores corresponds to a specific skill, and
wherein each score in the second set of scores corresponds to a personality trait.

15. A computing device comprising:
a display unit;
a set of one or more processing units;
a storage device storing a set of instructions, wherein an execution of the set of instructions by the set of processing units configures the computing device to perform acts comprising:
providing a graphical user interface (GUI) at the display unit;
receiving background information regarding the candidate by using the GUI;
deriving an assessment regarding a candidate from the received background information, wherein the assessment comprises an array of assessment scores that can be modified by the candidate;
identifying a set of roles based on the assessment;
displaying the set of roles and receiving a selection of a role from among the set of roles from a user by using the GUI;
providing a simulated experience of the selected role by the display unit and receiving a set of interaction data from the simulated experience by using the GUI to determine a suitability for the selected role;
producing a recommendation for the candidate based on the received interaction data; and
providing a career progression that indicates a relationship between a second set of roles and which role of the second set of roles to be considered after which role.

16. The computing device of claim 15, wherein the execution of the set of instructions further configures the set of processing units to allow adjustment of the set of assessment by using the GUI.

17. The computing device of claim 15, wherein the set of roles is displayed as a progression of roles that comprises one or more career paths, each career path comprising a set of nodes, each node corresponding to a different role.

18. The computing device of claim 15, wherein the execution of the set of instructions further configures the set of processing units to provide a coding platform by using the GUI to allow the candidate to perform domain-specific tasks for the selected role.

19. The computing device of claim 15, wherein the set of instructions for providing the simulated experience comprises generating an avatar to represent the candidate based on the received background information regarding the candidate.

20. The computing device of claim 15, wherein execution of the set of instructions further configures the set of processing units to adjust the assessment regarding the candidate based on the received set of interaction data.

* * * * *